United States Patent Office 2,754,245
Patented July 10, 1956

2,754,245

INTERHALOGEN ADDUCTS OF POLYVINYL PYRROLIDONE

William A. Hosmer, Pittsfield, Mass., assignor to General Aniline & Film Corporation, New York, N. Y., a corporation of Delaware No Drawing. Application September 23, 1954, Serial No. 457,996

6 Claims. (Cl. 167—70)

The present invention relates to interhalogen adducts of polymeric 1-vinyl-2-pyrrolidone (hereinafter referred to as polyvinyl pyrrolidone) and to a process of preparing the same.

The combination of polyvinyl pyrrolidone with iodine has resulted in the formation of a stable adduct. In copending application of Herman A. Shelanski, Serial No. 276,449 filed on March 13, 1952, there is disclosed a novel composition of polyvinyl pyrrolidone and iodine which has been found to be of substantial value for many applications in which advantage is taken of the bactericidal activity of the iodine, by which in turn the irritating, sensitizing and toxic properties of the iodine are substantially overcome.

As disclosed in this application, the novel iodine-polyvinyl pyrrolidone composition is prepared by adding a solution of iodine or a tincture of iodine to an aqueous solution of polyvinyl pyrrolidone. Such composition may also be prepared, as disclosed in the copending application of Hans Beller and W. A. Hosmer, Serial No. 282,458 filed on April 15, 1952, now U. S. Pat. 2,706,701 issued April 19, 1955, by thoroughly mixing dry elemental iodine with dry powdered polyvinyl pyrrolidone. The iodine and powdered polymer are mixed until a homogeneous powder is obtained, the mixing being carried out by grinding the iodine and polyvinyl pyrrolidone in a mortar and pestle or in a suitable mechanical mixer such as a ball mill constructed of materials which are not attacked by iodine. Thereafter the homogeneous mixture is heated for a period of time ranging from 22 to 64 hours at a temperature of 90-100° C.

Attempts, while utilizing the foregoing procedures, to obtain a bromine adduct, resulted in a composition of lessened stability. The preparation of a chlorine adduct in stable form has proved unsuccessful. While utilizing the foregoing and other procedures a stable polyvinyl pyrrolidone complex containing available chlorine or bromine together with iodine has been demanded by the chemical industry, especially in the bleaching and disinfecting fields.

To provide an interhalogen adduct, a polyvinyl pyrrolidone containing either chlorine or bromine together with iodine and having many new industrial uses constitutes the principal object of the present invention.

Other objects and advantages will appear from the following description.

I have found that valuable compositions of polyvinyl pyrrolidone containing either chlorine or bromine together with iodine and which are in stable form can be readily prepared by mixing iodine monochloride or iodine monobromide with polyvinyl pyrrolidone until a homogeneous mixture is obtained, and then heating the mixture in a closed container for a period of time ranging from 1½ to 8 hours at a temperature not exceeding 95° C. The products thus obtained are not only useful as bleaching and disinfecting agents, but also as antiseptics and mustard gas decontaminants. The iodine monochloride adduct of polyvinyl pyrrolidone is uniquely adaptable as a bleaching agent in the textile industry and as a mustard gas decontaminant. In the latter case, the iodine monochloride adduct of polyvinyl pyrrolidone is sprayed in the form of an aqueous solution containing from 10 to 25 parts by weight of the iodine monochloride adduct into the atmosphere contaminated with mustard gas. It is of special value in chemical laboratories and plants where such gas is employed as an intermediate or coreactant in chemical reactions. Where a leak occurs from a chemical reaction system or from a cylinder containing the gas, a painful blistering effect from the gas is minimized, and in some instances completely controlled by the spraying of not only the individual but also of the area contaminated with the gas. The iodine monochloride and the iodine monobromide adduct of polyvinyl pyrrolidone are especially useful as disinfectants not only in barns, in stalls, around the farm but in homes and hospitals.

The polyvinyl pyrrolidone employed in accordance with the present invention is prepared by the procedure described in the United States Patents 2,265,450 and 2,335,454. Depending upon the extent of polymerization, the polymers have molecular weights ranging from 500 to 200,000. Viscosity measurements are used as an indication of the average molecular weight of the polymer (polyvinyl pyrrolidone) which is characterized by a chain of carbon atoms attached through their nitrogen atoms:

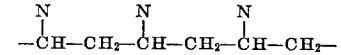

The polymer has the following general formula:

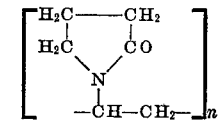

The viscosity coefficient, K, which is fully described in Modern Plastics, 23, No. 3, 157–61, 212, 214, 216, 218 (1945) is calculated as follows:

$$\frac{\text{Log}_{10} \eta \text{ rel}}{C} = \frac{75K^2}{1+1.5KC} + K$$

where C is the concentration in grams per 100 cc. of polymer solution and $\eta$ rel is the ratio of the viscosity of the solution to that of pure solvent. The K values are reported as 1000 times the calculated viscosity coefficient in order to avoid the use of decimals. For the purpose of the present invention, I employ those polymers having a K value of 10 to 100, preferably of 30 to 100 because of their viscosity at lower concentrations.

The number of recurring polymer units enclosed by brackets in the foregoing general formula, indicated by "$n$" the extent or degree of polymerization, corresponds to a chain of 192 to 980 monomer units. In actual practice, a mixture of polymer each containing a different number ($n$) of monomer units is always produced.

The iodine monochloride may be employed as such or prepared from iodine trichloride. The latter is prepared by adding iodine to liquid chlorine at −95° C. The yellow product was allowed to hydrolyze to the brown iodine monochloride which may be used in the blending or mixing with the polyvinyl pyrrolidone. The iodine monobromide may be purchased as such or simply prepared by the direct combination of the elements by known means.

The following examples will serve to illustrate how the various interhalogen adducts of polyvinyl pyrrolidone may be prepared in accordance with the present invention. It is to be understood, however, that these examples are merely illustrative and are not to be considered as limitative of the invention disclosed and claimed. All the parts are by weight unless otherwise specified.

*Example I*

To 40 parts of polyvinyl pyrrolidone having a K value of 30, 10 parts of iodine monochloride were mixed at room temperature in a glass container until a homogeneous orange product was formed. The product was then heated in a closed glass container for 2½ hours at 90° C. Upon analysis it showed the following halogen content:

|  | Percent | Six Weeks Later, Percent |
|---|---|---|
| Available iodine | 10.1 | 11.2 |
| Available chlorine | 2.9 | 3.2 |
| Total iodine | 17.4 | 19.6 |
| Total chlorine | 7.2 | 6.6 |

25 parts of the iodine monochloride adduct of polyvinyl pyrrolidone prepared as above were added to ordinary tap water to make 100 parts of a solution. This solution immediately bleached yellowish muslin upon contact therewith. After rinsing with water and drying, the muslin remained white. The same solution when sprayed into a chamber of 1 cu. yd. volume and containing 150 p. p. m. of mustard gas completely decontaminated the area within one minute.

*Example II*

To 20 parts of polyvinyl pyrrolidone having a K value of 30 were added 3.4 parts of iodine monobromide followed by dry blending in a glass vessel until a homogeneous product was formed. The product was then heated for six hours at 90° C. Chemical analysis of the halogen content and phenol coefficient showed the following results:

Available iodine, 5.1%; available bromine, 3.2%.
Iodide ion, 3.0%.
Bromide ion, 1.9%.
Phenol coefficient 19 against *Salmonella typhosa* at 20° C.

For application as a disinfectant and deodorant 10 to 30 parts by weight of the product of Example II are dissolved in sufficient water to form 100 parts of aqueous solution. One part of the resulting solution per 100 parts of water is sufficient to disinfect and deodorize any odoriferous or foul smelling area.

In addition to the foregoing uses, the interhalogen adducts of polyvinyl pyrrolidone are of particular value in the preparation of sensitized gelatino silver halide emulsions. In such use, 15 to 25 parts by weight of either the iodine monochloride or iodine monobromide adduct are dispersed in a sufficient quantity of the customary gelatin dispersion to form 100 parts by weight of total emulsion. To the resulting emulsion a sufficient quantity of silver nitrate is added to combine with the available halogen in the formation of mixed silver halides. The emulsion is washed several times with water in the usual manner, sensitized with a sensitizing dye, ripened, and then coated upon a suitable subbed cellulose acetate base.

I claim:

1. The method of producing a stable interhalogen adduct of polyvinyl pyrrolidone which comprises uniformly mixing an iodine monohalide selected from the class consisting of iodine monochloride and iodine monobromide with polyvinyl pyrrolidone, then heating the mixture in a closed container at a temperature ranging from 90–95° C.

2. The method according to claim 1 wherein the iodine monohalide is iodine monochloride.

3. The method according to claim 1 wherein the iodine monohalide is iodine monobromide.

4. A dry stable powder of interhalogen adduct of polyvinyl pyrrolidone selected from the group consisting of polyvinyl pyrrolidone-iodine monochloride and polyvinyl pyrrolidone-iodine monobromide.

5. A dry stable powder according to claim 4 wherein the interhalogen adduct of polyvinyl pyrrolidone is polyvinyl pyrrolidone-iodine monochloride.

6. A dry stable powder according to claim 4 wherein the interhalogen adduct of polyvinyl pyrrolidone is polyvinyl pyrrolidone-iodine monobromide.

References Cited in the file of this patent

UNITED STATES PATENTS

| 2,158,411 | Elion | May 16, 1939 |
| 2,706,701 | Beller et al. | Apr. 19, 1955 |

OTHER REFERENCES

West: "I. X-Ray Diffraction by Addition Compounds of Halogens With Hydrophilic Organic Polymers," J. Chem. Physics, 1947, p. 689.

Fourneau: "Sur Le Chlorure D'Iode." Comptes Rendus Soc. De Biol., 1918, pp. 1192–1196.